April 12, 1955  B. N. FOX ET AL  2,705,857
METHOD OF AND APPARATUS FOR MAKING WRAPPED CANDY SUCKERS
Filed July 28, 1953  6 Sheets-Sheet 1
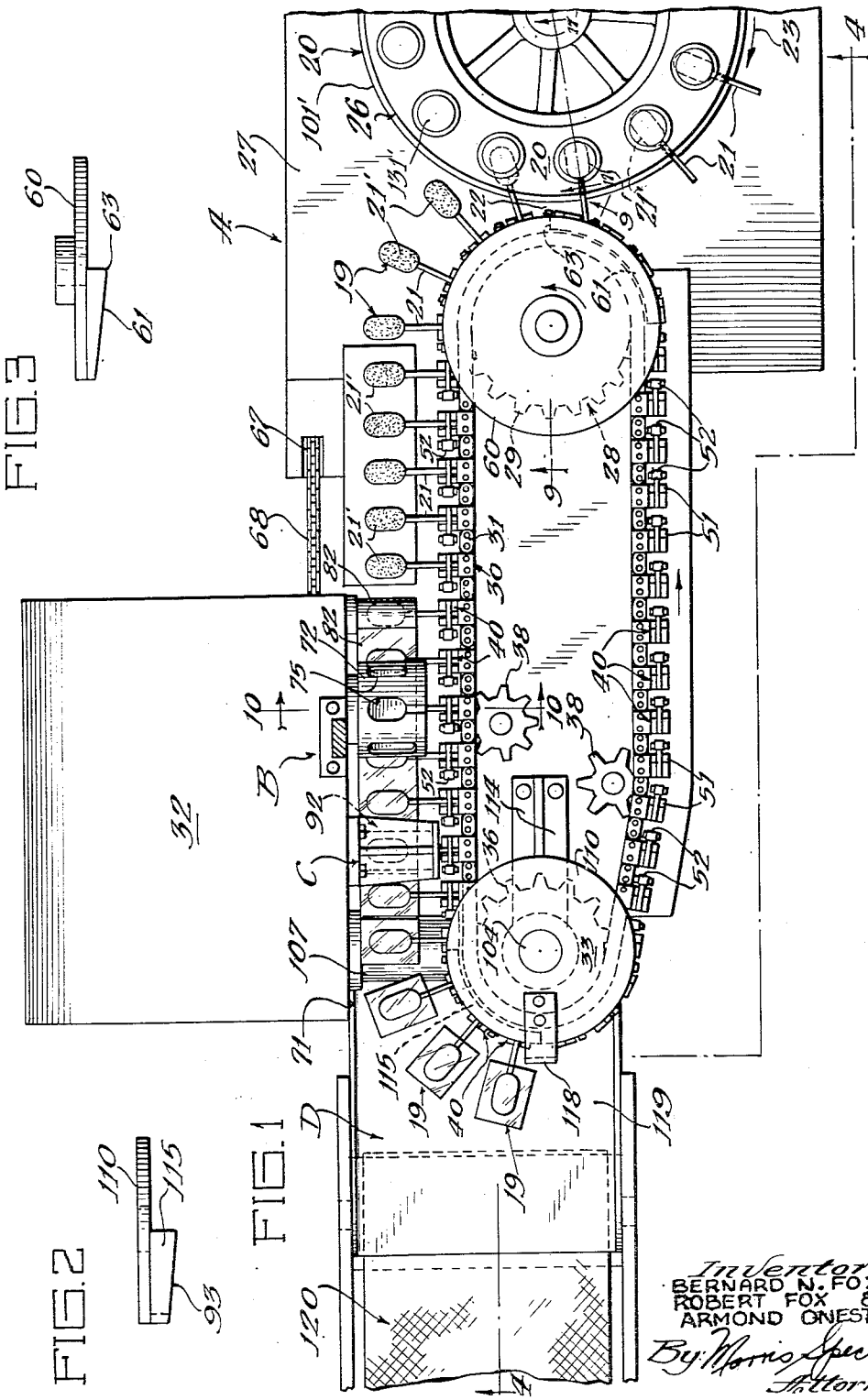

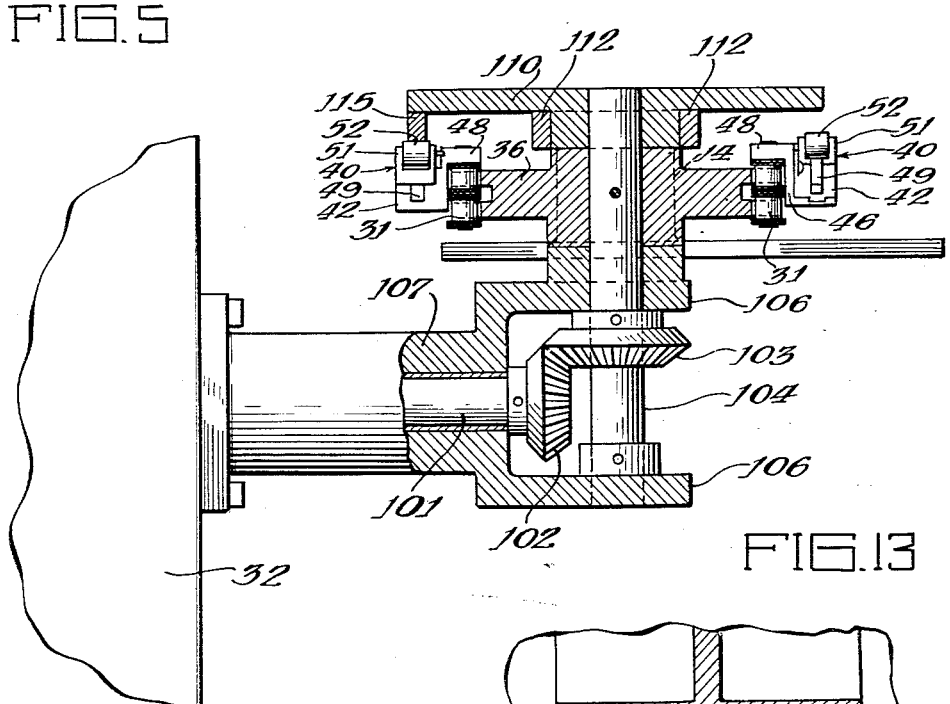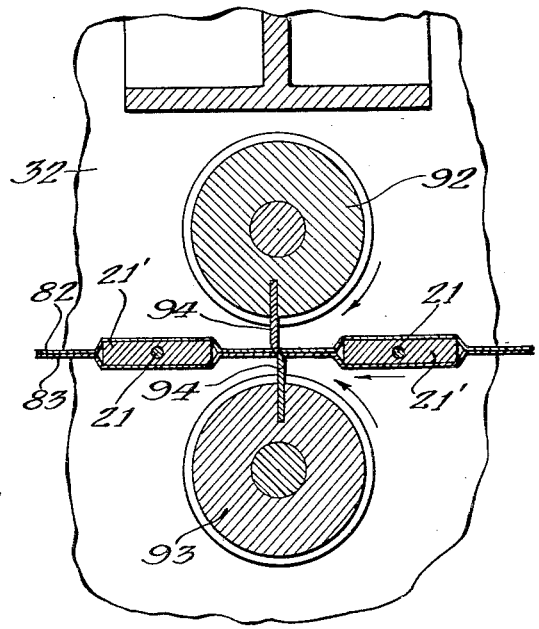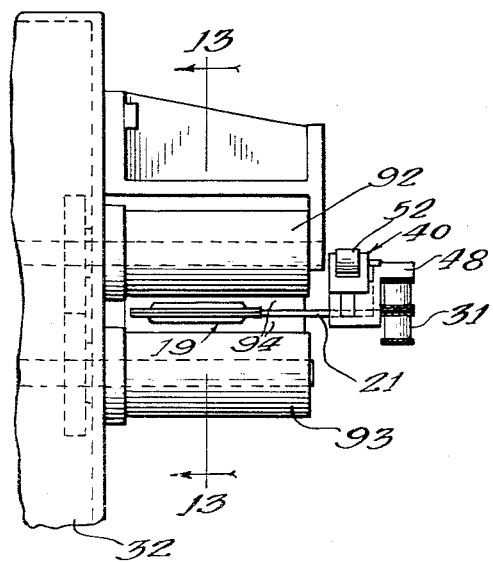

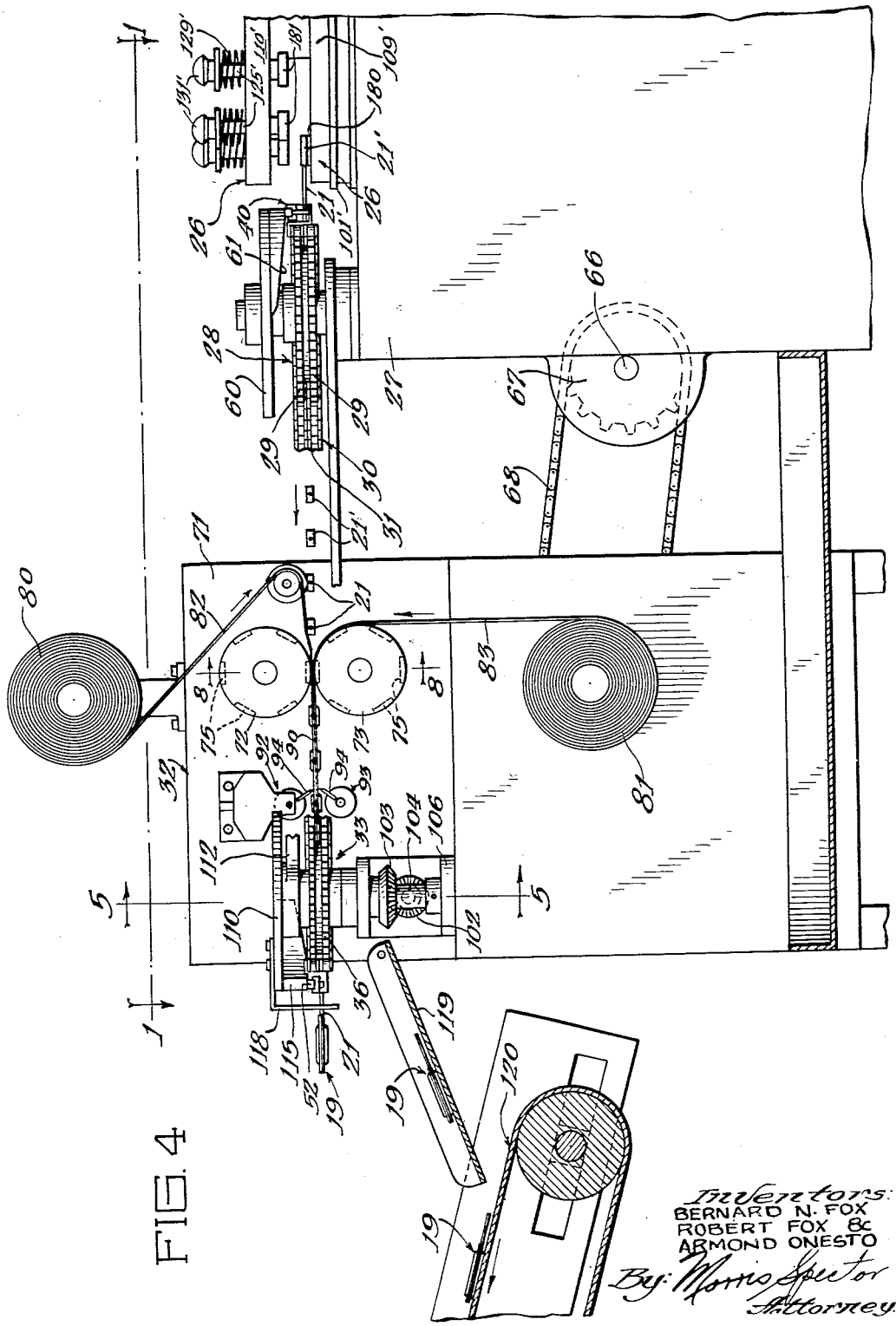

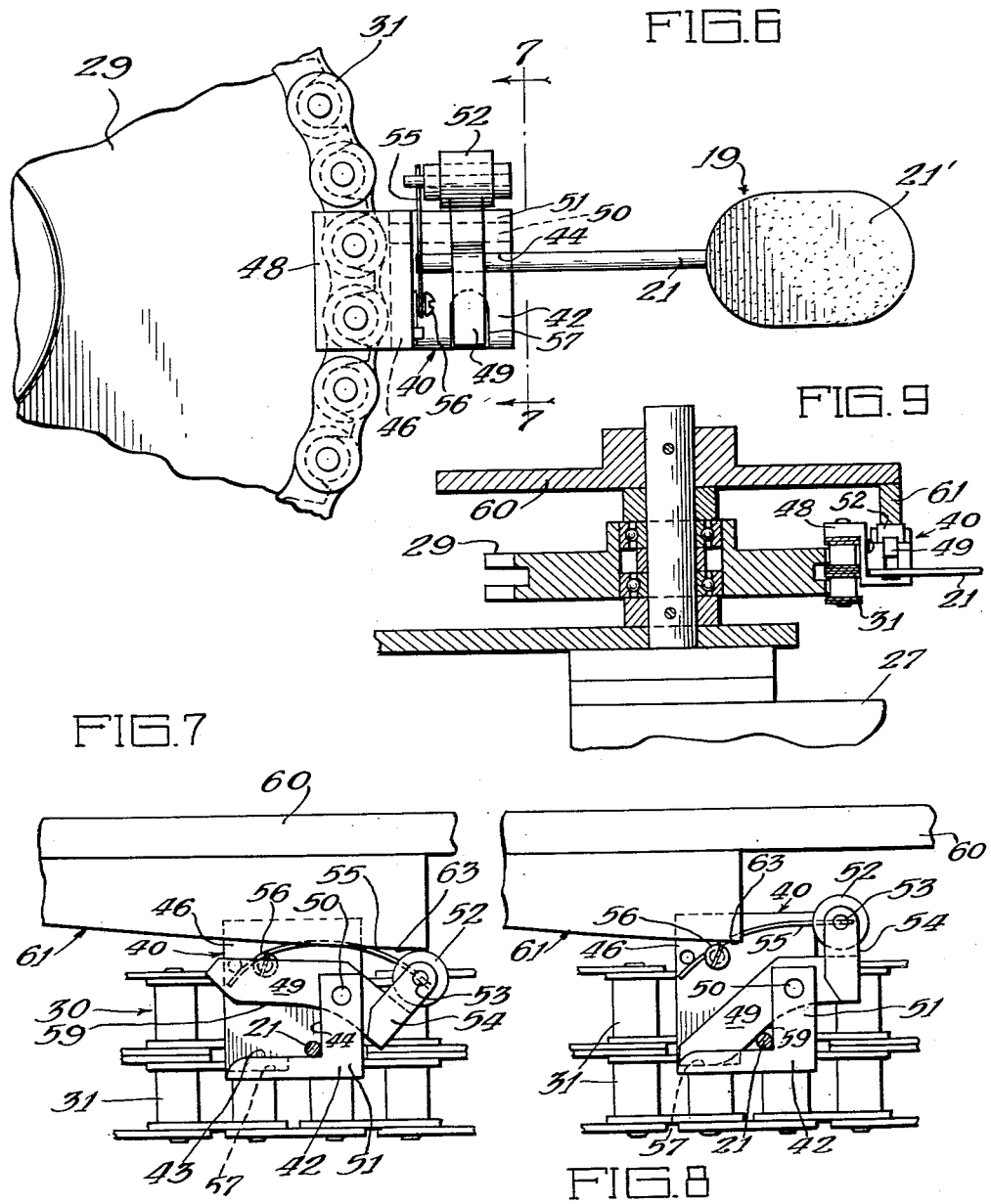

April 12, 1955   B. N. FOX ET AL   2,705,857
METHOD OF AND APPARATUS FOR MAKING WRAPPED CANDY SUCKERS
Filed July 28, 1953   6 Sheets-Sheet 5
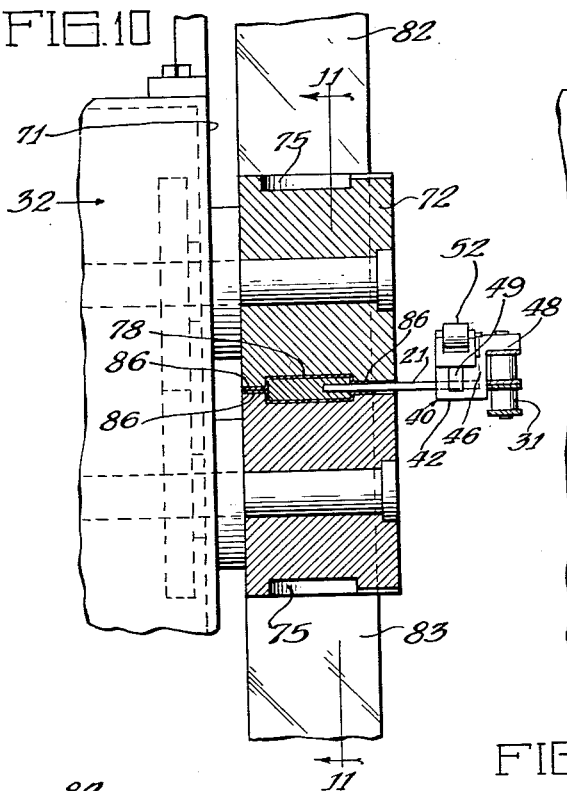
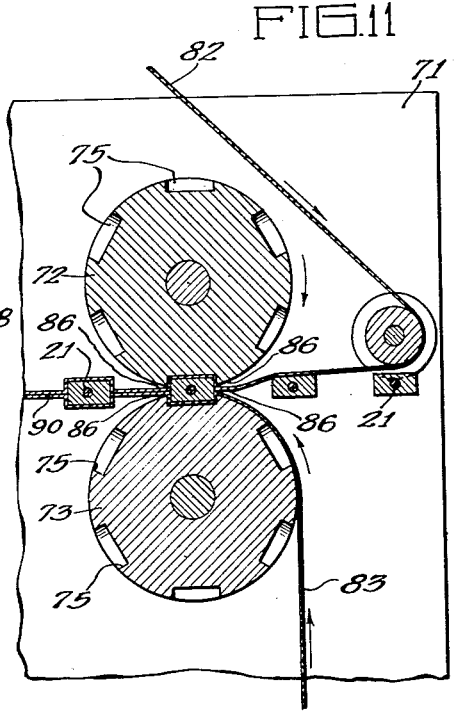
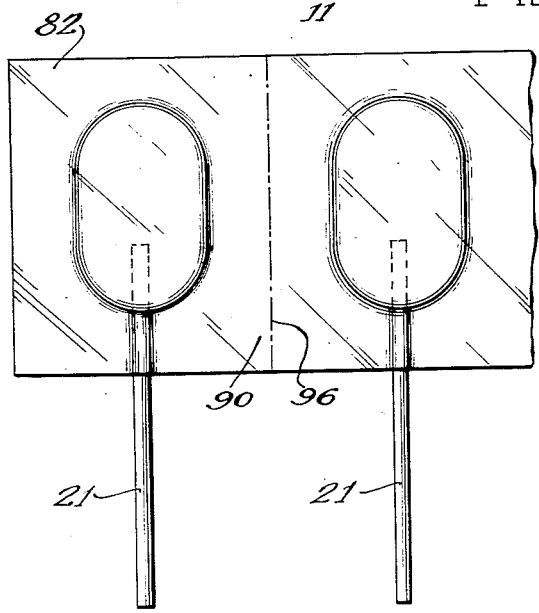
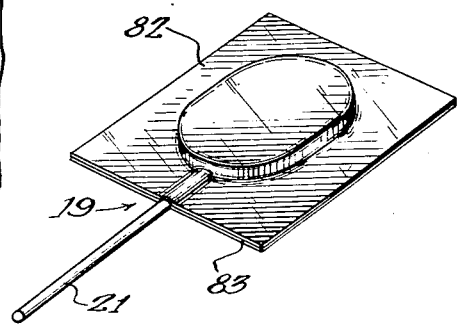
Inventors:
BERNARD N. FOX
ROBERT FOX &
ARMOND ONESTO
By Morris Spector
Attorney

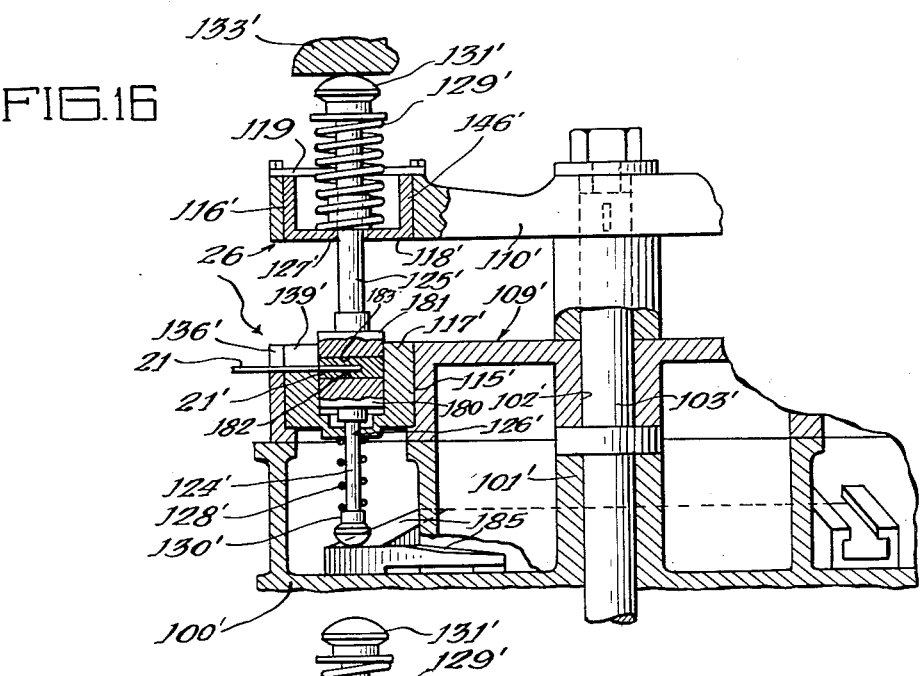

United States Patent Office 2,705,857
Patented Apr. 12, 1955

2,705,857

METHOD OF AND APPARATUS FOR MAKING WRAPPED CANDY SUCKERS

Bernard N. Fox, Robert Fox, and Armond Onesto, Chicago, Ill., assignors to F & F Laboratories, Inc., Chicago, Ill., a corporation of Illinois Application July 28, 1953, Serial No. 370,757

5 Claims. (Cl. 53—6)

This invention relates to a method of and an apparatus for making and wrapping candy, particularly candy of the type known as "suckers" or "lollipops."

It has heretofore been customary to make preformed lollipops on a machine which forms the lollipop with a stick or other handle inserted thereinto and delivers the product in a warm and soft condition, which then hardens as it cools. A machine of this type, to which reference may be had, is shown in United States Patents Nos. 2,431,489 and 2,637,281. The machine of the type shown in the latter of the two above patents is provided with a take-up mechanism that is intended to lift the individual suckers from the forming dies of the machine. In machines of the above type the sucker must first be elevated out of its molding die before it can be moved away from the machine. This requires a complicated take-up mechanism. It is one of the objects of the present invention to provide a sucker making machine of the above mentioned character wherein the sucker is so formed that a warm, molded sucker is ultimately elevated to a position such that a take-off mechanism may merely slide the sucker off of the die by a horizontal motion. The take-off mechanism can then carry the sucker onwardly to subsequent stations where subsequent operations are performed on the sucker, such as, for instance, wrapping operations.

It is a further object of the present invention to provide a process of making wrapped suckers wherein a warm, soft sucker is moved directly from the sucker forming machine to the wrapping machine where it is wrapped, and if it is somewhat deformed it is there brought into the proper shape, all while the sucker retains the original warmth present during the forming operation, and while the sucker is therefore still moldable.

It has been customary to wrap formed candy suckers between two sheets of cellophane the confronting edges of which are heat sealed about a hard sucker by a pair of heated die members. The opposed die surfaces define a cavity which receives the candy to be wrapped. Not infrequently, a piece of hardened candy is imperfectly formed so that it punctures the cellophane as the die surfaces of the wrapping machine are brought together to effect the heat-sealing operation. In such a situation, the dies often break off bits of candy. Broken pieces of hard candy remaining at the die surfaces interfere with the wrapping of candy subsequently carried to the die members, with the result that the die-wrapping machine must be stopped for removal of the broken pieces of candy and the wrappings that followed.

It should be noted that if the candy suckers are allowed to harden before the die-wrapping operation, as heretofore practiced, the nature of the candy used is such that it can not be readily softened by heating.

The present invention provides a novel and inexpensive method and apparatus for overcoming the aforesaid problems. In accordance with the method aspects of the present invention, the formed candy pieces are die wrapped as above described, before they have hardened. When the wrapping die members are brought together to effect a heat sealing operation of the wrapping sheets around the candy piece, irregularities in the formed candy which are reached by the dies are automatically eliminated by the die surfaces which press the still warm and soft candy into the desired shape while simultaneously performing a heat sealing operation on the wrapping material.

In accordance with another aspect of the present invention, a plurality of candy stick-receiving fixtures are secured at definite, preferably equal, spaced intervals on a conveyor which passes adjacent to the candy discharge station of a sucker forming machine. The stick-receiving fixtures each include a pair of clamping jaws which, in cooperation with a cam surface located at said discharge station and a cam follower secured to a portion of one of said jaws, are opened at the appropriate moment to receive the free end of the candy stick of a sucker at the discharge station of the candy forming machine. The jaws are then closed about the candy stick, and the candy and associated stick is thereby removed from the candy forming machine. The conveyor carries the stick-receiving fixture and the candy sucker held thereby to a die wrapping machine where the die wrapping operation above described is performed without necessitating removal of the candy sucker from the fixture.

The candy forming machine and the conveyor and the wrapper sealing equipment are operated in timed relation from a common source of motive power. A stick-receiving fixture will thus always be automatically carried into position opposite the discharge station of the candy forming machine as the candy forming machine brings a freshly made candy sucker to the discharge station thereof. Further, the synchronism or timed relation between the conveyor, the wrapping machine and candy forming machine is retained independently of changes in the speed of the source of motive power.

These and other features and advantages of the invention will be described in more detail in connection with the detailed description to follow. An exemplary embodiment of the invention is shown in the drawings, it being understood that variations in construction may be made thereof without departing from the broader aspects of the present invention.

Fig. 1 is a plan view of an apparatus embodying the present invention taken along line 1—1 of Fig. 4;

Fig. 2 is a side elevational view of the left cam plate as shown in Fig. 1;

Fig. 3 is a side elevational view of the right cam plate as shown in Fig. 1;

Fig. 4 is a side elevational view of the equipment shown in Fig. 1;

Fig. 5 is a fragmentary view showing the drive sprocket assembly and associated gearing for driving same, taken partly along section line 5—5 of Fig. 4;

Fig. 6 is an enlarged fragmentary plan view of a portion of the conveyor chain of Fig. 1;

Fig. 7 is a fragmentary elevational view of the stick-receiving fixture taken along section line 7—7 of Fig. 6 when the jaws of the fixture are held in their open position;

Fig. 8 is a view similar to Fig. 7 but showing the fixture jaws in their closed position;

Fig. 9 is a fragmentary sectional side view, taken along section plane 9—9 in Fig. 1, showing the right sprocket assembly as shown in Fig. 1;

Fig. 10 is a fragmentary sectional view, taken along section line 10—10 of Fig. 1, showing the candy sucker in engagement with opposed side surfaces for heat sealing a wrapping about the candy sucker;

Fig. 11 is a fragmentary vertical section of the die members shown in Fig. 10, taken along section line 11—11 thereof;

Fig. 12 is a side elevational view of the rotary cutters which sever the wrapping material extending between adjacent wrapped suckers;

Fig. 13 is a sectional view of the apparatus of Fig. 12, taken along section line 13—13;

Fig. 14 is a fragmentary plan view of two suckers following the die wrapping operations showing heat sealed strips of wrapping material extending between the two suckers;

Fig. 15 is a perspective view of the separated wrapped suckers following a severing operation.

Fig. 16 is a cross-sectional view through the die assembly of the candy forming machine showing a pair of dies in position to form a candy sucker; and Fig. 17 is a sectional view through a die assembly of the candy forming machine opposite the discharge station, taken along section line 17—17 in Fig. 1.

Reference may now be had more particularly to the drawings wherein the same reference numerals indicate like parts throughout.

In the accompanying drawings there is shown a combination of machines including a novel sucker forming machine and a sucker wrapping machine mechanically associated together to operate as a single mechanism, it being understood that the two machines which are geared together to operate as a single mechanism may comprise separate machines or may be built together as a single structure. The combination of the present invention includes a sucker forming station A, a sucker wrapping station B, a sucker separating station C where the individual wrapped suckers are separated from one another, a conveyor D for receiving individually wrapped, warm suckers from the machine and carrying them away for cooling, and a combination conveyor and take-off mechanism that takes the suckers from the forming station A and carries them in timed relationship to the stations B, C and D and releases them. At the time the suckers are released at D the candy is still warm and soft and would be tacky if it were not wrapped. However, the wrapping protects the candy against coming in contact with anything and thus prevents sticking of the warm soft candy to other objects. The station A includes a candy forming machine 20 which forms the individual candy suckers 19, each in a soft condition, each comprising a formed piece of sucker candy 21' from which projects a stick or other handle 21. The discharge station of the machine 20 is indicated at 22, that being the place where the take-off mechanism which operates in synchronism with the forming mechanism takes the individual suckers from the forming mechanism for conveyance to the wrapping machine. In the present instance, the suckers are what is known in the art as "flat suckers," namely suckers having opposite flat sides. In the drawings, the candy forming machine 20 is shown only partially, omitting from the drawings parts of the machine that are well known, thereby to avoid unduly complicating the drawings. For a more complete understanding of the construction of the machine insofar as concerns the parts thereof that are not shown in the drawings, reference may be had to United States Patent No. 2,637,281. It is sufficient here to state that the candy making machine 20 includes a circular, axially rotatable, composite carriage or table 26 having die cavities uniformly spaced around the axis of rotation of the table, in which cavities there are die assemblies, to be hereinafter described, for forming a warm, soft, mass of candy sucker material about a stick 21. By the time the candy reaches the discharge station 22 it has been formed and is still in a warm and soft condition, but is sufficiently stiff or form-retaining so that it retains its formed shape when moved away from the carriage 26. The composite carriage 26 is rotated continuously in a direction indicated by the arrow 23 by a motor, so that it continuously moves completed suckers to the discharge station 22. The mechanism for rotating the carriage is the same as that illustrated in the patent previously described.

In order that an understanding may be had as to how the present machine 20 differs from the machine of prior Patent No. 2,637,281, reference may be had first to Figs. 16 and 17. The elements shown in these figures which correspond with and are the same as the elements of the apparatus in Patent No. 2,637,281 have been similarly numbered except that primes have been added to the reference numerals. A detailed explanation of the structure and operation of all corresponding elements will not be given since reference to said latter patent will give such details.

The composite carriage 26 includes a pair of vertically spaced, die-supporting, rotatable table mounts 109'—110' which are fixed to a vertically extending, axially rotatable drive shaft 103' for rotation therewith. A stationary base member 100' carried on stationary platform 27 seats the bottom table mount 109' and includes an upstanding hub 101' having an axial bore 102' thereof to receive the vertical drive shaft 103' therethrough.

A plurality of pairs of die receiving compartments 115' and 116' are uniformly circumferentially spaced from each other and the compartments of each pair are in vertical, aligned relation in the table mounts 109' and 110', and receive complementary die bodies 117' and 118'. It should be observed that the lower die bodies 117' are secured in the compartments 115' which are of complementary shape to serve as a support therefor. Similarly, the upper compartments 116' are provided with correspondingly shaped die bodies 118'. The lower die bodies 117' include cavities open at their top for receiving die elements 180 and 181. The top of the die bodies 117' are flush with the horizontal top face of the table mount 109'.

Confronting die elements 180 and 181 have flat, opposed die surfaces 182 and 183. Connected to the die elements are shanks 124' and 125', respectively, which are reciprocably mounted within bores 126' and 127' provided axially through the die bodies 117' and 118'. Compression springs 128' and 129' comprising helical springs envelop the die shanks 124' and 125' below and above the die bodies 117' and 118', respectively, to normally urge the die elements 180 and 181 into a separated position, with die elements 181 fully removed from within the lower die bodies 117'. Cam contact caps 130' and 131' are provided on the extremities of the die shanks 124' and 125' and serve as cam followers which ride on lower and upper annular cam surfaces 185 and 133', respectively, and also as stops for the springs 128' and 129'.

Cam surfaces 185 and 133' comprise the actuators for the die elements 180 and 181, respectively, by serving as tracks against which the cam follower caps 130' and 131' ride. The cam surface 133' is utilized in the candy forming operation and is positioned so that the cam follower caps 131' are depressed to a position such that the die elements 181 extend within the die bodies 117' in spaced, confronting relationship with the lower die elements 180, to form a flat candy sucker 21' therebetween, as shown in Fig. 16. Candy sticks 21 extend into the cavities within the die bodies 117' through slots 136' in the table mount 109'. The lower die bodies 117' are also slotted at 139' to receive the sticks. During the candy forming operation the lower cam surface 185 urges the lower cam follower caps 130' upward so that the candy pieces between the die elements 180 and 181 are compressed into their desired shape on the sticks 21. The opposed die surfaces 182 and 183 of the die elements 180 and 181, and the walls of the die bodies 117' form the die cavities to which the candy conforms.

Following the candy forming operation, just described, the upper cam follower caps 131' are released from contact with the cam surface 133' so that the force of the springs 129' raises the upper die element 181 to remove the same from within the die bodies 117'. The table mounts 109' and 110' are rotated to carry the formed candy suckers, which remain on the lower die elements 180, to the discharge station 22. The cam surface 185 at the discharge station rises to such a level that it pushes the lower die elements 180 upward within their associated die cavities to a position where the die surfaces 182 are flush with, or slightly above, the top face of the table mount 109' and die bodies 117', so that the formed candy suckers 19 are entirely removed from the cavities of the die bodies 117', as shown in Fig. 17. In the upward movement of the candy suckers in the die bodies 117', the candy sticks move upward within slots 136' and 139'. In their raised position, the sticks 21 of the candy suckers project above the table mount 109' of the composite carriage 26 and the suckers may be freely moved from the candy forming machine 20 by means of the instrumentalities, to be hereinafter described. These instrumentalities replace the take-up mechanism of the machine described in Patent No. 2,637,281 and move the suckers from contact with the lower die elements 180 by sliding the candy horizontally along the die surface 182 and the table mount 109'.

Above the platform 27 of the candy forming machine 20 there is mounted a sprocket assembly 28 adjacent to the carriage 26. The sprocket assembly 28 includes upper and lower coaxial sprocket wheel portions 29 which are mounted for rotation about a common, vertical axis. The sprocket wheel portions are in meshing engagement with a conveyor 30 for carrying the candy suckers from the discharge station 22 to a candy wrapping machine 32. The conveyor comprises an endless double tiered sprocket chain 31. At the end of the conveyor opposite the sprocket assembly 28 is a sprocket assembly 33 which includes a pair of driver sprocket wheels 36 which are in meshing engagement with double-tiered chain 31. The sprocket wheels 36 are continuously rotated. Freely rotatable idler gears 38 are located intermediate the end sprocket assemblies 28 and 33. One of the idler gears 38 is in proximity to the die-wrapping machine 32 so that the position of the chain is precisely defined where the candy is brought by the conveyor chain 31 into cooperative engagement with the elements making up the die-wrapping machine 32.

Stick-receiving fixtures 40 are secured to the chain 31 at regularly spaced intervals along the chain and extend outwardly of the chain. Each fixture 40 is moved by the chain into the path of movement of the candy sticks 21 projecting outwardly from the carriage of the candy forming machine 20 at the discharge station 22, and is adapted to grip such a stick and carry it, with the attached sucker, from the sucker forming machine to the wrapping machine.

Referring now more particularly to Figs. 5–10, each of the stick-receiving fixtures includes a generally L-shaped frame member 42 defining a pair of bearing or retaining surfaces 43 and 44 against which the candy stick 21 is held, in a manner to be explained. An upstanding wall 46, integral with the L-shaped frame 42, has at its upper end an outwardly formed flange 48 which overlies and is fastened to the chain 31 by suitable fastening means.

The candy stick 21 is clamped in place by an angular arm 49 which is pivoted intermediate its ends by a pivot pin 50 to an unstanding portion 51 of the L-shaped member 42. The upstanding portion 51 is slotted to receive the arm 49, the pivot pin 50 bridging the slot. At one end of the angular arm 49 there is a cam roller 52 pivoted about a pin 53 which is secured to an extension 54 of the angular arm 49. A spring wire 55 is anchored at one end to the wall 46 by a screw 56. The other end of the spring wire passes through an aperture in the pin 53 and normally urges the roller end of the angular arm 49 upward, that is, in the position illustrated in Fig. 8. It thereby also holds the pin 53 against movement out of the extension 54. The spring 55 holds the other end of the angular arm 49 in a groove 57 in the upper surface of the bottom leg of the L-shaped frame member 42. The candy stick is wedged or clamped between a stick-engaging surface 59 on the lower or inner edge of the angular arm 49 and the bearing surfaces 43 and 44. The latter bearing surfaces and the angular arm 49, in effect, are a pair of spring-urged clamping jaws which retain the candy stick 21 securely in place.

Overlying the sprocket assembly 28 is a stationary, circular cam plate 60 having a circumferentally disposed depending cam surface 61 which overlies and actuates the cam rollers 52 of the respective fixtures 40 as they are individually moved into a position adjacent to the outer periphery of the sprocket assembly 28 in the vicinity of the discharge station 22. The rollers are initially depressed against the force of the spring 55 by the downward extending cam surface 61. This separates the angular arm 49 from contact with its L-shaped frame member 42, as shown in Fig. 7. The space between the arm 49 and the L-shaped member 42 becomes accessible from the outer side and rear of the stick-receiving fixture 40. The movements of the chain 31 and the carriage 26 of the candy forming machine 20 are synchronized so that the machine 20 moves successive sticks 21 into engagement with the bearing surfaces 43 and 44 from the rear of successive fixtures as they reach a position opposite the discharge station 22. The roller of the fixture at that moment rests on the forward lip or edge 63 of the cam surface 61, as shown in Fig. 7. As the chain 31 moves onward from this position, the cam roller 52 is moved from the cam surface 61, and the spring 55 of the fixture 40 forces the angular arm 49 into clamping engagement with the candy stick 21, as shown in Fig. 8.

A common source of power is used to impart motion to all parts of the candy forming, candy wrapping, and conveyor apparatus used in the present invention, so that each unit may be operated in a definite predetermined timed relation with every other unit. In the particular embodiment herein illustrated, power for operating the conveyor 30 and for operating the wrapping machine 32 is taken from the mechanism that operates the candy forming machine 20. The candy forming machine 20, as illustrated in the aforementioned Latini et al. patent, includes an electric motor drive which, through suitable gearing, operates the carriage 26 and the other instrumentalities of the candy forming machine 20 to produce the candy sucker. A sprocket wheel 67 is mounted on a shaft 66 that is mechanically geared to the operating gearing of the candy forming machine 20 so that the shaaft 66 rotates at a speed which bears a fixed relationship to the speed of operation of the candy forming machine including the speed of rotation of the carriage 26. The sprocket wheel 67 is keyed to the shaft 66 and drives a sprocket chain 68 that extends into a gear box of the candy wrapping machine 32 and mechanically drives the instrumentalities of the candy wrapping machine. The candy wrapping machine is a conventional type of machine and by reason of the fact that it is driven by the candy forming machine, it follows that the operation of the candy wrapping machine is synchronized with the operation of the candy forming machine so that the speeding up or slowing down of the operation of the candy forming machine produces a corresponding speeding up or slowing down of the candy wrapping machine 32. The gearing included in the wrapping machine 32 operates the various instrumentalities of the wrapping machine in timed relationship to the operation of the candy forming machine. It is, of course, necessary that the conveyor 30 shall be operated in proper timed relationship to the operation of the candy forming machine 20 so that successive sets of fixtures 40 of the conveyor shall be in positions to receive successive suckers from the candy forming machine. It is also necessary that the conveyor operate in proper timed relationship with the operation of the wrapping machine so that successive suckers carried by the conveyor 30 are brought into wrapping position in proper timed relatinonship to the operation of the dies of the wrapping machine, as will hereinafter be described.

Candy suckers which are still in a warm and soft condition in which they leave the candy forming machine are carried by the stick-receiving fixtures 40 from the discharge station 22 to the die-wrapping machine 32 by the chain conveyor 31. At the first station of die-wrapping machine 32 the candy suckers are individually fed between a pair of wrapping sheets and to a pair of similar, heated, confronting continuously rotating cylindrical die wheels 72 and 73, each having a plurality of circumferentially spaced die cavities 75 at the periphery thereof. The die wheels 72 and 73 are moved at such a speed and the cavities 75 are so spaced that, as the die wheels rotate, successive die cavities of the dies 72 and 73 are brought successively into juxtaposed relation to define respective enclosed die cavities, as cavity 78 (see Figs. 10 and 11). These cavities conform generally to the size and shape of the candy suckers, with allowance being made for the thickness of the wrapping material to be heat sealed by the die wheels.

As shown most clearly in Fig. 4, respective strips 82 and 83 heat sealable wrapping material, such as cellophane tape, are unwound from reels 80 and 81, respectively, to extend between the die wheels 72 and 73. As the candy suckers are individually fed to the confronting surfaces of the die wheels 72 and 73, the flat upper and lower sides of the sucker are enveloped, respectively, by the cellophone strips. The speed of the chain 31 and of the die wheels 72 and 73 is such that a candy sucker is fed between the cavities of the die wheels 72 and 73 as a pair of die cavities of the wheels are brought into juxtaposed relation. The body of the candy sucker is thereby carried into a die cavity 78 and the opposed edges of the strips of wrapping material surrounding the candy sucker are heat sealed by the opposing heated surfaces 86 of the die wheels 72 and 73.

The present invention relates in part to the condition of the candy suckers as they are fed to the die wheels 72 and 73 for wrapping. Heretofore, candy suckers were fed to the die wrapping machine in a hard condition so that any sharp irregularities in the surface of the candy suckers punctured the strip of wrapping material as the suckers were enveloped by the opposed surfaces of the die members. By feeding the candy sucker in a soft or plastic condition to the die wheels 72 and 73, the pressure applied by the walls forming the die cavity 78 press a defectively formed piece of candy into the desired shape and the wrapping material is not damaged.

As the candy suckers leave the die wheels 72 and 73 they are completely surrounded by the heat sealed edges of the cellophane strips. The suckers leave the wrapping station joined by the intervening portions 90 of the cellophane strip extending between the suckers. A severing operation is required to separate the candy suckers into individual units. To effect this result, the wrapping machine 32 includes a pair of rotary cutters 92 and 93 of conventional design disposed on opposite sides of the strip of candy suckers moving from the die wheels 72 and 73. The rotary cutters 92 and 93 each comprise a rotary wheel with a radially disposed cutting edge 94 extending from each wheel. The location of these cutters is such that with each revolution of the rotary cutters, the cutting edges 94 engage the candy wrapping along a line 96 (see Fig. 14) extending halfway between each of the suckers. In this manner the candy suckers are individually severed.

In order to provide a proper timed movement of the conveyor 30 with respect to the movement of the instrumentalities of the candy wrapping machine the power for driving the conveyor 30 is taken off from the candy wrapping machine. Accordingly, a power take-off shaft 101 extends from the candy wrapping machine and is continuously driven thereby, in synchronism with the movement of the operating instrumentalities of the candy wrapping machine, the shaft 101 being geared directly to the gearing within the machine 32 that operates the wrapping instrumentalities. The shaft 101 has a bevel gear 102 keyed thereto. The gear 102 is in mesh with a bevel gear 103 keyed on a shaft 104. The shaft 104 is journalled on a pair of arms 106—106 that are part of a sleeve 107 in which the shaft 101 is journalled, which sleeve is bolted to the casing of the candy wrapping machine 32. The shaft 104 extends at its outer end into a cover plate 110 that overlies the sprocket wheels 36 and is secured against rotation as by a split collar 112 that has a pair of arms 114 (see Fig. 1) extending angularly therefrom and secured to a frame that is secured to the outside of the candy wrapping machine 32. The cover plate 110 carries a releasing cam 115 on its under side for actuating the fixtures 40 to release the wrapped suckers carried thereby as the respective fixtures come into proper position for this purpose. This cam is similar to the cam 60, previously described.

During the wrapping and severing operations previously described, each candy stick is supported from a corresponding fixture 40. The next operation to be performed, therefore, is to remove the candy sticks from engagement with the jaws of the stick-receiving fixtures. The jaws of the fixtures are first opened by the releasing cam 115 which extends into the path of movement of the roller 52 of each fixture 40. The front end of the angular arm 49 of the fixture 40 is depressed as the roller engages the depending cam surface 115. This releases the rear end of the arm 49 from clamping engagement with the associated candy stick. If the candy piece does not fall by its own weight it is pushed by a stationary, vertically extending stick release arm 118 which is directed into the path of movement of the candy sticks. The front edge of the arm 118 engages the front face of a candy stick as the conveyor moves the associated fixture past the arm 118. The candy drops onto a chute 119 on which it slides by gravity to a moving conveyor belt that holds the suckers during cooling, while the candy hardens. The belt may carry the candy through an air cooled chamber to facilitate this.

Although a preferred embodiment of the invention has been described in considerable detail, the description thereof is, for the most part, intended to be illustrative rather than restrictive, and many details may be modified or changed without departing from the broader aspects of the invention.

We claim:

1. In the art of producing wrapped hard candy suckers wherein a sucker making machine forms the candy substantially to shape and with a stick inserted therein while the candy is in a warm and plastic condition and wherein such candy suckers are delivered by the sucker making machine in the warm, plastic condition and they harden upon cooling, the method which comprises operating a wrapping machine in synchronism with the sucker making machine, gripping the individual sucker sticks one by one as the suckers are delivered by the sucker making machine and conveying them to the wrapping machine in synchronism with the operation of the sucker making machine and the wrapping machine and at such a rate that they reach the wrapping machine while they are still in a warm and plastic condition, and performing the wrapping operation on the suckers while the suckers are still warm and plastic and are held by their sticks.

2. In the art of producing wrapped hard candy suckers formed from a mass of plastic moldable material which hardens after a period of time wherein a sucker making machine forms the candy substantially to shape and with a stick inserted therein while the candy is in a plastic condition and wherein such candy suckers are delivered by the sucker making machine in the plastic condition, the method which comprises gripping the individual sucker sticks with the candy impaled thereon one by one as the suckers are delivered by the sucker making machine and conveying them to a wrapping machine at a rate such that they reach the wrapping machine while they are still plastic and can be molded to shape, and performing the wrapping operation on the suckers by closely enveloping wrapping material around the candy of the suckers while the suckers are still plastic.

3. In candy processing apparatus having a candy forming unit adapted to produce a formed piece of warm soft candy impaled on the end of a stick and deliver individual pieces of such candy in a soft condition and their associated sticks one at a time to a discharge station, the candy being of the kind that hardens thereafter, a candy wrapping machine having a wrapping station including apparatus for die-pressing a wrapping material closely about each piece of candy fed thereto, and a conveyor extending from the said discharge station to and past said candy wrapping machine, a plurality of spaced stick-moving fixtures carried by said conveyor each including means for gripping said sticks at said discharge station and retaining the grip thereon until the candy has left the wrapping station whereby the candy is wrapped while the attached candy sticks are gripped by said fixtures, means for actuating said stick-gripping fixtures to release the candy sticks at a point past said discharge station, and means for imparting motion to said candy forming machine, conveyor and candy wrapping machine in timed relation so that successive stick-moving fixtures are moved into position for receiving successive candy sticks from the discharge station of said candy forming machine and conveying them to said wrapping station, the rate of operation of the conveyor being such that candy that is received thereby at the discharge station is still in a soft moldable condition at the time it is delivered to the wrapping machine, whereby the candy is still in a soft condition while the candy is wrapped by said die wrapping apparatus.

4. Apparatus for producing and wrapping candy suckers each comprising a piece of candy impaled on a handle, said apparatus including a sucker forming machine having means for receiving sucker forming candy material which is in a soft moldable condition and which thereafter hardens, said machine having means for shaping the candy material to the desired shape by exerting pressure thereon and impaling the material on a handle all while the candy material is still soft and moldable to shape, a candy sucker wrapping machine having means for applying a flexible wrapping to the formed candy while the candy is in its soft moldable condition, moving conveyor mechanism for receiving from the sucker forming machine the sucker handles with the candy impaled thereon while the candy is still in a soft moldable condition and conveying the suckers to the wrapping machine, and means for operating the candy forming machine, the candy wrapping machine and the conveyor mechanism in synchronism, the distance of travel of the suckers to the wrapping machine and the rate of movement of the conveyor being such that the suckers carried thereby reach the wrapping machine for wrapping while the candy is still soft and moldable, whereby the suckers are wrapped and the wrapping material protects the candy during the subsequent hardening period.

5. Apparatus for producing and wrapping candy suckers each comprising a piece of candy impaled on a handle, said apparatus including a sucker forming machine having means for receiving sucker forming candy material which is in a soft moldable condition and which thereafter hardens, said machine having means for shaping the candy material to the desired shape by exerting pressure thereon and impaling the material on a handle all while the candy material is still soft and moldable to shape, a candy sucker wrapping machine having means for applying a flexible wrapping to the formed candy while the candy is in its soft moldable condition and for shaping deformed soft candy suckers by pressing the suckers through the wrapping material, moving conveyor mechanism for receiving from the sucker forming machine the sucker handles with the candy impaled thereon while the candy is still in a soft moldable condition and conveying the suckers to the wrapping machine, the conveyor having uniformly spaced handle moving fixtures mounted thereon each for gripping the handle of a sucker, and means for operating the candy forming machine, the candy wrapping machine and the conveyor mechanism in synchronism, the distance of travel of the suckers to the wrapping machine and the rate of movement of the conveyor being such that the suckers carried thereby reach the wrapping machine for wrapping while the candy is still soft and moldable whereby the suckers are wrapped and the wrapping material protects the candy during the subsequent hardening period.

References Cited in the file of this patent

UNITED STATES PATENTS

| Number | Name | Date |
|---|---|---|
| 1,810,864 | Vogt | June 16, 1931 |
| 1,864,114 | Angerpointer | June 21, 1932 |
| 1,960,456 | Robb | May 29, 1934 |
| 2,166,568 | Kuhlke | July 18, 1939 |
| 2,319,281 | Winters | May 18, 1943 |
| 2,486,758 | Pfeiffer | Nov. 1, 1949 |
| 2,547,836 | Pfeiffer | Apr. 3, 1951 |
| 2,637,281 | Latini | May 5, 1953 |